United States Patent
Lin et al.

(10) Patent No.: US 9,498,017 B2
(45) Date of Patent: Nov. 22, 2016

(54) POWER GENERATION DEVICE AND SHOE EQUIPMENT HAVING POWER GENERATION DEVICE

(71) Applicants: Che Wei Lin, Hsinchu (TW); He Chen Chen, Keelung (TW)

(72) Inventors: Che Wei Lin, Hsinchu (TW); He Chen Chen, Keelung (TW)

( * ) Notice: Subject to any disclaimer, the term of this patent is extended or adjusted under 35 U.S.C. 154(b) by 88 days.

(21) Appl. No.: 14/486,865

(22) Filed: Sep. 15, 2014

(65) Prior Publication Data

US 2015/0097374 A1    Apr. 9, 2015

(30) Foreign Application Priority Data

Oct. 4, 2013  (TW) .............................. 102135961 A

(51) Int. Cl.
*F03G 5/06* (2006.01)
*A43B 3/00* (2006.01)

(52) U.S. Cl.
CPC ............... *A43B 3/0015* (2013.01); *F03G 5/06* (2013.01)

(58) Field of Classification Search
CPC ................. F03G 7/08; H02K 35/02; H02K 7/1853; A43B 3/0078; A43B 23/24; A43B 3/0031
USPC ............................................ 290/1 R; 36/136
See application file for complete search history.

(56) References Cited

U.S. PATENT DOCUMENTS

| | | | | |
|---|---|---|---|---|
| 1,015,298 A * | 1/1912 | Cleveland | ................. | F03G 1/00 185/39 |
| 4,674,199 A * | 6/1987 | Lakic | ................... | A43B 1/0054 219/211 |
| 4,736,530 A * | 4/1988 | Lakic | ....................... | A43B 7/02 165/46 |
| 4,756,095 A * | 7/1988 | Lakic | ................... | A43B 13/18 36/2.6 |
| 4,782,602 A * | 11/1988 | Lakic | ................... | A41D 19/001 219/211 |
| 4,823,482 A * | 4/1989 | Lakic | ................... | A41D 19/001 165/46 |
| 4,845,338 A * | 7/1989 | Lakic | ................... | A41D 19/001 219/211 |
| 5,167,082 A * | 12/1992 | Chen | ................... | A43B 1/0036 219/211 |
| 5,495,682 A * | 3/1996 | Chen | ................... | A43B 3/0005 219/211 |
| 6,201,314 B1 * | 3/2001 | Landry | ................... | A43B 3/00 290/54 |

(Continued)

FOREIGN PATENT DOCUMENTS

WO    WO 0221955 A1 *   3/2002   .......... A43B 1/0036

*Primary Examiner* — Tulsidas C Patel
*Assistant Examiner* — Charles Reid, Jr.
(74) *Attorney, Agent, or Firm* — WPAT, P.C., Intellectual Property Attorneys; Anthony King

(57) ABSTRACT

A power generation device includes a first pivot arm having a shank extendable in a predetermined direction, and a rack arranged along the predetermined direction, wherein the shank has a slot between the rack and an end portion of the shank; a second pivot arm having a first end portion coupled with the end portion of the shank at a first pivot; and a third pivot arm having a first end portion coupled with a second end portion of the second pivot arm at a second pivot, and a second end portion of the third pivot arm coupled with the slot of the shank at a third pivot.

15 Claims, 9 Drawing Sheets

(56) References Cited

U.S. PATENT DOCUMENTS

| | | | | |
|---|---|---|---|---|
| 6,239,501 B1* | 5/2001 | Komarechka | A43B 3/00 | 290/1 R |
| 6,281,594 B1* | 8/2001 | Sarich | A43B 3/00 | 290/1 A |
| 6,744,145 B2* | 6/2004 | Chang | A43B 3/0005 | 219/211 |
| 7,005,757 B2* | 2/2006 | Pandian | F03G 5/06 | 290/1 R |
| 7,219,449 B1* | 5/2007 | Hoffberg | A43B 1/0054 | 36/29 |
| 7,279,011 B2* | 10/2007 | Phillips | A61F 2/602 | 623/53 |
| 7,956,476 B2* | 6/2011 | Yang | A43B 3/00 | 290/1 R |
| 8,087,186 B2* | 1/2012 | Rastegar | A43B 7/02 | 290/1 A |
| 8,375,600 B2* | 2/2013 | Adams | A43B 7/081 | 36/3 B |
| 8,598,721 B2* | 12/2013 | Baarman | A47C 15/004 | 290/1 C |
| 8,692,397 B1* | 4/2014 | Lai | H02K 35/02 | 290/1 R |
| 8,872,362 B2* | 10/2014 | Lee | A43B 3/0015 | 290/1 A |
| 8,907,505 B2* | 12/2014 | Fortier | A43B 3/0015 | 290/1 R |
| 8,970,054 B2* | 3/2015 | Stanton | F03G 5/06 | 290/1 C |
| 9,107,468 B1* | 8/2015 | Xiong | A43B 7/02 | |
| 9,190,886 B2* | 11/2015 | Stanton | H02K 7/1861 | |
| 2004/0226188 A1* | 11/2004 | Lin | A43B 7/02 | 36/2.6 |
| 2006/0003839 A1* | 1/2006 | Lawrence | G06F 3/0334 | 463/36 |
| 2006/0046907 A1* | 3/2006 | Rastegar | A61H 3/00 | 482/91 |
| 2006/0235465 A1* | 10/2006 | Koo | A43B 1/0054 | 606/204 |
| 2006/0250043 A1* | 11/2006 | Chung | H02K 5/08 | 310/216.004 |
| 2011/0260469 A1* | 10/2011 | Baarman | A47C 15/004 | 290/1 C |

* cited by examiner

POWER GENERATION DEVICE AND SHOE EQUIPMENT HAVING POWER GENERATION DEVICE

FIELD

The present disclosure relates to a power generation device, and particularly, to a power generation device transforming kinetic energy into electrical power.

BACKGROUND

A power generation device is a medium for transforming energy into electrical power. The energy source may be wind, water, fire and other natural forces. In addition to power generation devices that convert natural energy into electrical energy, there are also devices that generate power by a user himself/herself. An example is hand-operated power generating devices. However, such devices may be inefficient, laborious and inconvenient, and provide a relatively low generating capacity. Another example is power generation shoes. Piezoelectric-type power generation shoes, however, may have the similar issue with low power output and may include complicated circuitry.

SUMMARY

The present disclosure provides a power generation device including a first pivot arm having a shank extendable in a predetermined direction, and a rack arranged along the predetermined direction, wherein the shank has a slot between the rack and an end portion of the shank; a second pivot arm having a first end portion coupled with the end portion of the shank at a first pivot; and a third pivot arm having a first end portion coupled with a second end portion of the second pivot arm at a second pivot, and a second end portion of the third pivot arm coupled with the slot of the shank at a third pivot, wherein, in response to a force in a first direction, the second pivot arm is configured to cause the first pivot arm to extend in the predetermined direction with respect to the third pivot within a predetermined range defined by the slot.

In some embodiments, the first pivot arm includes a main plate integral with the rack.

In some embodiments, the first pivot arm is configured to slide on a pair of rails.

In some embodiments, the rack meshes with at least two power generation gears.

In some embodiments, the slot has a size which allows the first pivot arm to move with respect to the third pivot in the predetermined direction.

In some embodiments, the third pivot arm includes a curved portion to separate the third pivot arm from the first pivot arm.

In some embodiments, the third pivot has an end fixed at a case.

In some embodiments, the first pivot arm includes at least two racks.

The present disclosure provides a shoe equipment having a power generation device including a bottom case having a pair of rails; a power generation device including: a first pivot arm having a shank extendable in a predetermined direction, and a rack arranged along the predetermined direction, wherein the shank has a slot between the rack and an end portion of the shank; a second pivot arm having a first end portion coupled with the end portion of the shank at a first pivot; a third pivot arm having a first end portion coupled with a second end portion of the second pivot arm at a second pivot, and a second end portion of the third pivot arm coupled with the slot of the shank at a third pivot, wherein, in response to a force in a first direction, the second pivot arm is configured to cause the first pivot arm to extend in the predetermined direction with respect to the third pivot within a predetermined range defined by the slot; a spring; and a lid secured to the second pivot and covering the bottom case, wherein the spring is configured to restore the lid to a first position.

In some embodiments, the first pivot arm includes a main plate integral with the rack.

In some embodiments, the first pivot arm is configured to slide on the rails.

In some embodiments, the rack meshes with at least two power generation gears.

In some embodiments, the slot has a size which allows the first pivot arm to move with respect to the third pivot to move in the predetermined direction.

In some embodiments, the third pivot arm includes a curved portion to separate the third pivot arm from the first pivot arm.

In some embodiments, the third pivot has an end fixed at the case.

In some embodiments, the first pivot arm includes at least two racks.

In some embodiments, the bottom case has a shape of a heel that is embedded in shoes.

In some embodiments, the power generation structure further includes at least one battery.

In some embodiments, the power generation structure further includes a load module.

In some embodiments, the power generation structure further includes an external connection port.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed might be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Aspects of the present disclosure are described with reference to the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
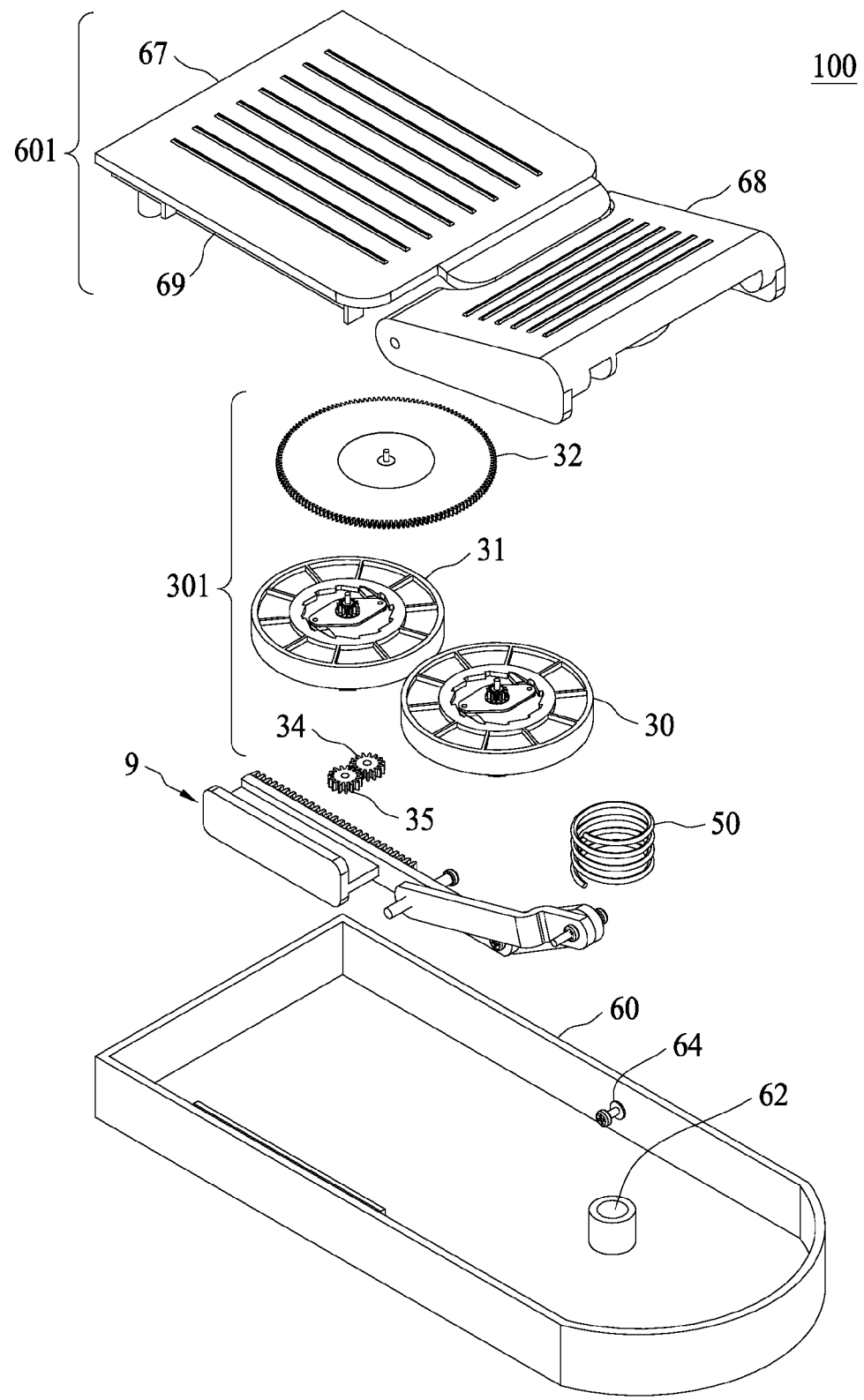
FIG. 1 is an exploded view of a power generation device in accordance with some embodiments of the present disclosure.

FIG. 1 is an exploded view of a power generation device 100 in accordance with some embodiments of the present disclosure. The power generation device 100 is configured to transform kinetic energy into electrical energy, and may be used in conjunction with an article or apparatus that is directly or indirectly in contact with a user for converting human power into electrical energy. Examples of the article or apparatus include a pedal, a mat, a floor tile, a ground brick and shoes. In some embodiments, the power generation device 100 is embedded in the heel of a shoe or integrated with a shoe, but is not limited thereto.

Referring to FIG. 1, the power generation device 100 includes a transmission mechanism 9, a gear set 301, a lid set 601, and a bottom case 60. The transmission mechanism 9 includes pivot arms to transmit an external force. Specifically, the transmission mechanism 9 is configured to change the transmission of a force in a first direction to transmission in a second direction. For example, by the transmission mechanism 9, a force applied in a vertical direction is transmitted in a horizontal direction.

The gear set 301 includes a plurality of gears. The gear set 301 is configured to transform a translational momentum of the transmission mechanism 9 into an angular momentum, which results in electrical energy.

The lid set 601 covers the bottom case 60. In addition, the lid set 601 and the bottom case 60 protect internal parts of the power generation device 100. As a force is applied on the power generation device 100 in a first direction, the force causes the lid set 601 to extend the transmission mechanism 9 in a second direction. As such, the transmission mechanism 9, in response to a force applied in the first direction, transmits the force in the second direction. The force transmitted in the second direction is exerted on the gear set 301 so as to produce electrical energy.

The bottom case 60 accommodates the transmission mechanism 9 and the gear set 301. The shape of the bottom case 60 may match with a size of shoes. The bottom case 60 is implemented as a heel or a sole, but is not limited thereto.

The bottom case 60 has a shape of a heel that is embedded in shoes. The bottom case 60 or the lid set 601 may be made of lightweight and durable material, such as plastic or hard rubber, which is compatible with shoe manufacturing.

The lid set 601 includes a first lid 67 and a second lid 68. The first lid 67 covers the bottom case 60, and is fixed to the bottom case 60 by, for example, screws. The lid set 601 and the bottom case 60 thus together protect internal parts of the power generation device 100. The first lid 67 further includes a rib 69. The rib 69 is configured to guide the transmission mechanism 9 to extend in a predetermined direction, such as the second direction.

The second lid 68 is hinged at sidewalls of the bottom case 60. For example, a pivot 64 hinges the second lid 68 so that the second lid 68 rotates with respect to the first lid 67. In some embodiments, the second lid 68 rotates within a predetermined range between a first position and a second position. In the first position, the first lid 67 and the second lid 68 form an angle ranging from approximately 100 to 170 degrees. In the second position, the first lid 67 and the second lid 68 form an angle of about 180 degrees. As a force in the first direction is applied on the second lid 68, the second lid 68 rotates from the first position to the second position. As the second lid 68 moves from the first position to the second position, a torque with respect to the first lid 67 is produced. The torque is applied on the transmission mechanism 9 and causes the transmission mechanism 9 to transmit the force in the second direction.

The gear set 301 includes gears 30, 31, 32, 34 and 35. The gears 30 and 31 are power generation gears that are capable of transforming angular momentum into electrical power. Although two power generation gears 30 and 31 are illustrated, other numbers of power generation gears are within the contemplated scope of the present invention. For example, the gear set 301 may include more than two power generation gears so as to increase power generation capacity. The function and structure of a power generation gear is briefly described as follows. External kinetic energy makes the core rotate. Internal coils of the power generation gear sense magnetic changes so as to generate induced electromotive force. Thus, electrical power is formed. In some embodiments, the power generation gears 30 and 31 generate electrical power only in one directional, such as clockwise or counterclockwise. In some embodiments, the power generation gears 30 and 31 generate electrical power in both directions.

The gear 32 simultaneously engages the gears 30 and 31. By function of the gears 34 and 35, the force transmitted in the second direction by the transmission mechanism 9 indirectly drives the gears 30 and 31. The gears 30 and 31 transform the force into an angular momentum and hence into electrical energy.

The power generation device 100 further includes an elastic component, for example, a spring 50. The spring 50 is mounted on a holder 62 of the bottom case 60. In operation, in response to a force exerted in the first direction, the second lid 68 is pressed into the second position. Later, the spring 50 is configured to restore and push the second lid 68 to the first position when the force is removed. By means of the spring 50, the power generation device 100 is allowed to operate repeatedly.

Figure 2:
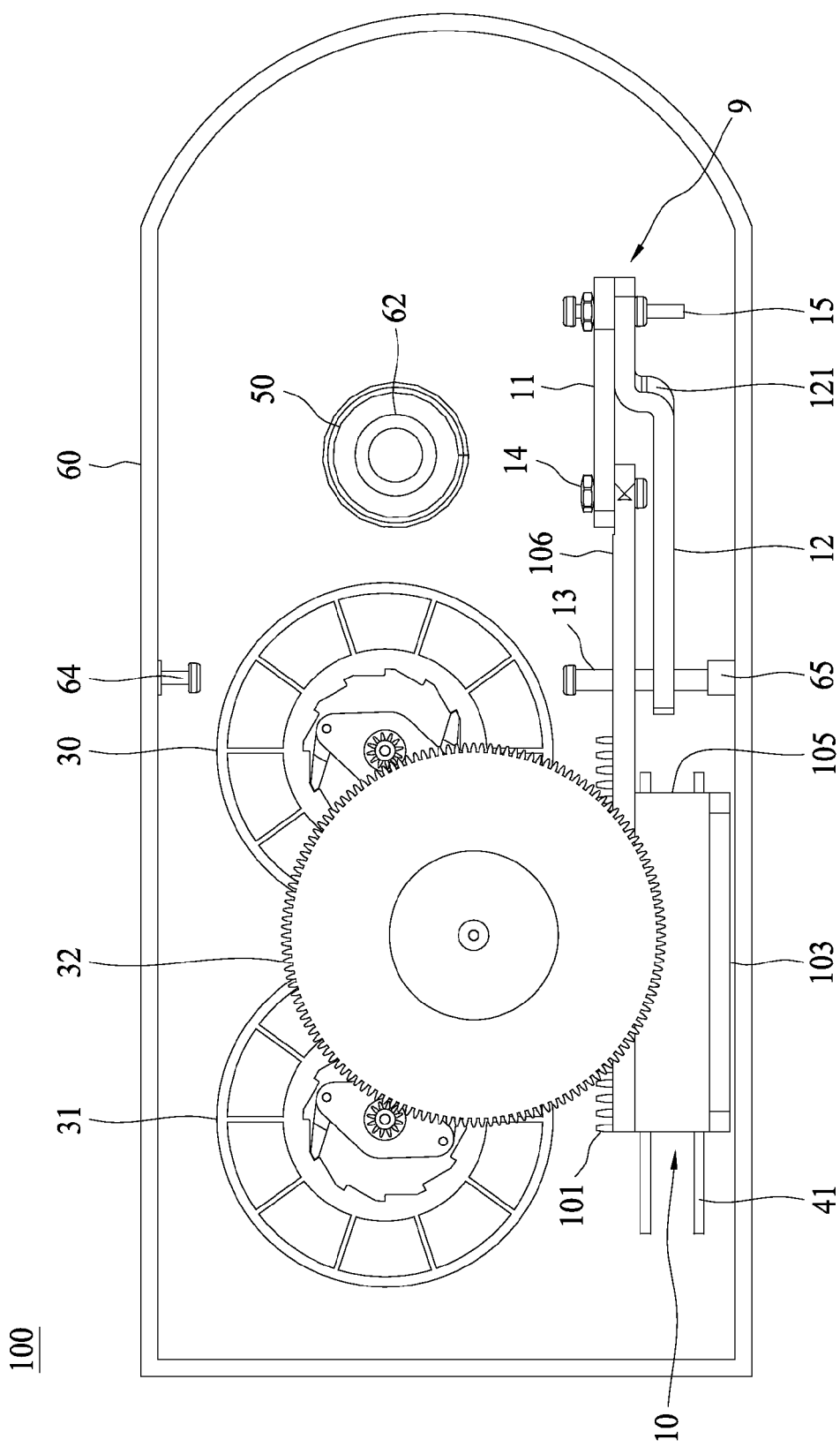
FIG. 2 is a top view of the power generation device of FIG. 1 in accordance with some embodiments of the present disclosure.

FIG. 2 is a top view of the power generation device 100 in accordance with some embodiments of the present disclosure. Referring to FIG. 2, the transmission mechanism 9 includes a first pivot arm 10, a second pivot arm 11, and a third pivot arm 12. The first pivot arm 10 includes a side plate 103, a main plate 105, a shank 106, and a rack 101. The first pivot arm 10 is configured and sized to move along a pair of rails 41 on the bottom case 60. Although exemplary rails 41 are shown in a pair, a mono-rail or other forms of guiding rails are within the contemplated scope of the present disclosure. The main plate 105 is integral with the rack 101 and the side plate 103. Moreover, the rack 101 and the side plate 103 are formed on opposite sides of the main plate 105. Accordingly, the first pivot arm 10 is able to slide on the rails 41 in a predetermined direction. The rack 101, which is oppositely positioned to the side plate 103, includes tooth-like protrusions arranged on the shank 106 along the predetermined direction. The rack 101 is configured to mesh with the gear set 301. The shank 106, which is oppositely positioned to the side plate 103, extends towards the second pivot arm 11 in the predetermined direction. Further, an end portion of the shank 106 is pivotally coupled with the second pivot arm 11. In some embodiments, the first pivot arm 10 is integrally molded.

The rack 101 meshes with the gear 35 and indirectly drives the gears 30 and 31. Accordingly, the force transmitted in the second direction by the transmission mechanism 9 can be exerted on the gears 30 and 31. Thus, kinetic energy of the force applied in the first direction is transformed into electrical energy. Effectively, as a user of the power generation device 100 walks or jogs, the body weight of the person repeatedly exerted on the second lid 68 causes a corresponding movement of the transmission mechanism and the gear set 301. Accordingly, kinetic energy generated by the user is transformed into electrical energy.

The side plate 103 faces to an inner sidewall of the bottom case 60. In addition, the side plate 103 extends lengthwise along the inner sidewall. In some embodiments, the transmission mechanism 9 is disposed on the right side or left side of the bottom case 60. Further, and the side plate 103 is disposed between the main plate 105 and the corresponding inner sidewall. In some embodiments, the first pivot arm 10 includes at least two racks and at least two gear sets associated with the racks. Thus, the side plate 103 is replaced with one of the racks so as to increase power generation capacity.

The second pivot arm 11 has an elongated shape. The second pivot arm 11 couples with the shank 106 of the first pivot arm 10 at a first pivot 14. Further, the second pivot arm 11 couples with the third pivot arm 12 at a second pivot 15. Specifically, a first end portion of the second pivot arm 11 couples with an end portion of the shank 106 at the first pivot 14. In addition, a second end portion of the second pivot arm 11 couples with a first end portion of the third pivot arm 12 at the second pivot 15. An end of the second pivot 15 is fixed to the second lid 68 to secure the transmission mechanism 9 to the second lid 68. As a result, when a force is applied on the second lid 68, the second lid 68 moves up and down in the first direction while the transmission mechanism 9 moves back and forth in the second direction.

The third pivot arm 12 includes a curved portion 121. The curved portion 121 includes two corners that are about 90 degrees or more. The curved portion 121 provides an enough space between the third pivot arm 12 and the first pivot arm 10. During operation of the transmission mechanism 9, the curved portion 121 causes the third pivot arm 12 to not contact or interfere with the first pivot arm 10 or the first pivot 14. The curved portion 121 also provides a space between the first pivot 14 and the third pivot arm 12 so that they are away from each other. As a result, the curved portion 121 facilitates a compact design of the transmission mechanism 9.

A second end portion of the third pivot arm 12 couples with the shank 106 at a third pivot 13. The third pivot 13 is longer than the first pivot 14 and the second pivot 15. The third pivot 13 penetrates through the second end portion of the third pivot arm 12 and the first pivot arm 10. Further, one end of the third pivot 13 is fixed at a hole 65 of the bottom case 60.

The abovementioned pivots 13, 14 and 15 or pivot arms 10, 11 and 12 are made of a higher mechanical endurance material that allows compression from an external force without deformation. The material includes, for example, steel, stainless steel, polymers, alloys, composite materials, and hard plastic. In some embodiments, the pivots 13, 14 and 15 are implemented by screws and nuts. Moreover, every two of the pivot arms 10, 11 and 12 are pivotally connected by one of the pivots 13, 14 and 15.

The bottom case 60 includes the rails 41, which are configured to guide the first pivot arm 10 to slide and move in a predetermined direction. In addition, the rib 69 of the first lid 67 also guides the first pivot arm 10 to prevent derailment of the first pivot arm 10 from the rails 41. Further, the third pivot 13 confines the first pivot arm 10 to slide within a predetermined range. Therefore, the transmission mechanism 9 can slide forward and backward along the rails 41 on the bottom case 60.

The bottom case 60 includes an additional pivot 64 opposed to the third pivot 13. The second lid 68 is pivoted by the pivot 64 and the third pivot 13 at one side. Another side of the second lid 68 remote to the pivoted side is free to move with respect to the pivoted side. Further, the spring 50 is disposed under the second lid 68. The spring 50 is configured to restore the second lid 68 back to the first position. During operations, in response to a force applied in the first direction, the second lid 68 rotates with respect to the pivot 64 or 13 from the first position to the second position. Because the second lid 68 is secured to the second pivot 15 at the free side, the force applied in the first direction simultaneously pushes and drives the transmission mechanism 9 to extend in the second direction. As the force is removed, the spring 50 restores the second lid 68 back to the first position. Therefore, the spring 50 associated with the second lid 68 facilitates repeated operations by an external force.

Figure 3A:
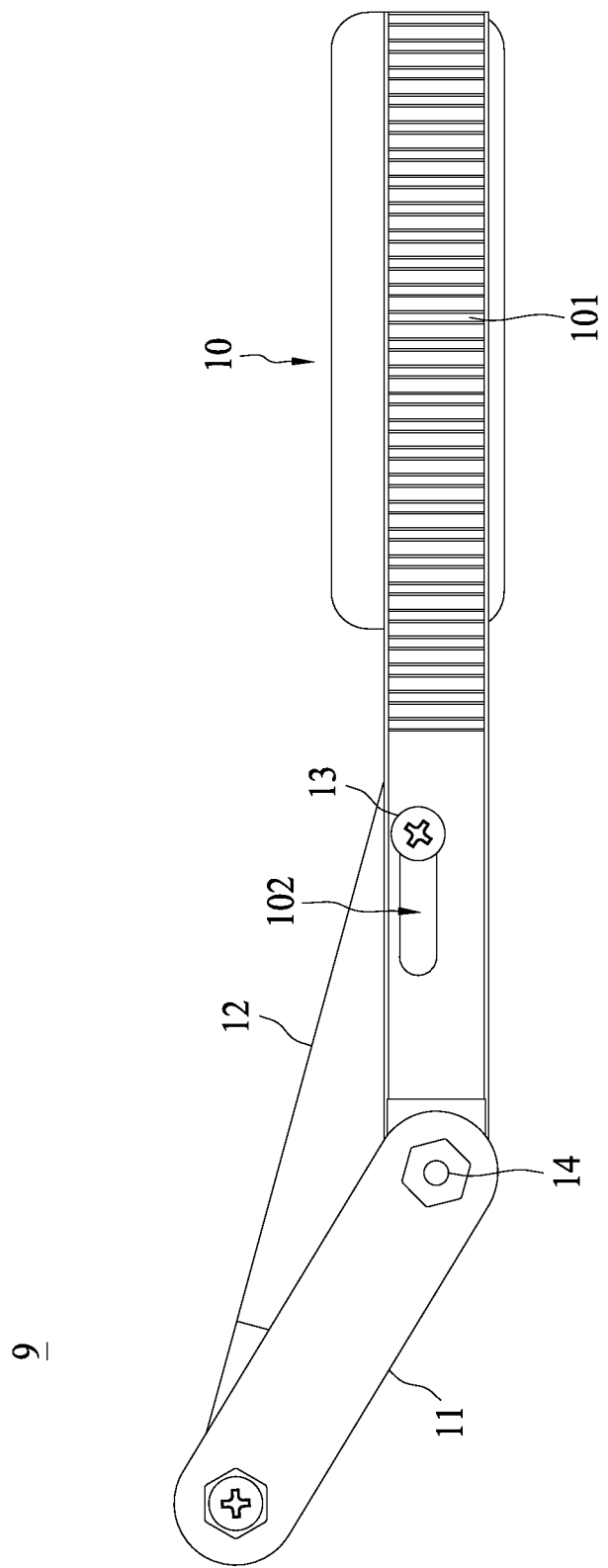
FIGS. 3A-3C are schematic diagrams of a transmission mechanism in accordance with some embodiments of the present disclosure.
Figure 3B:
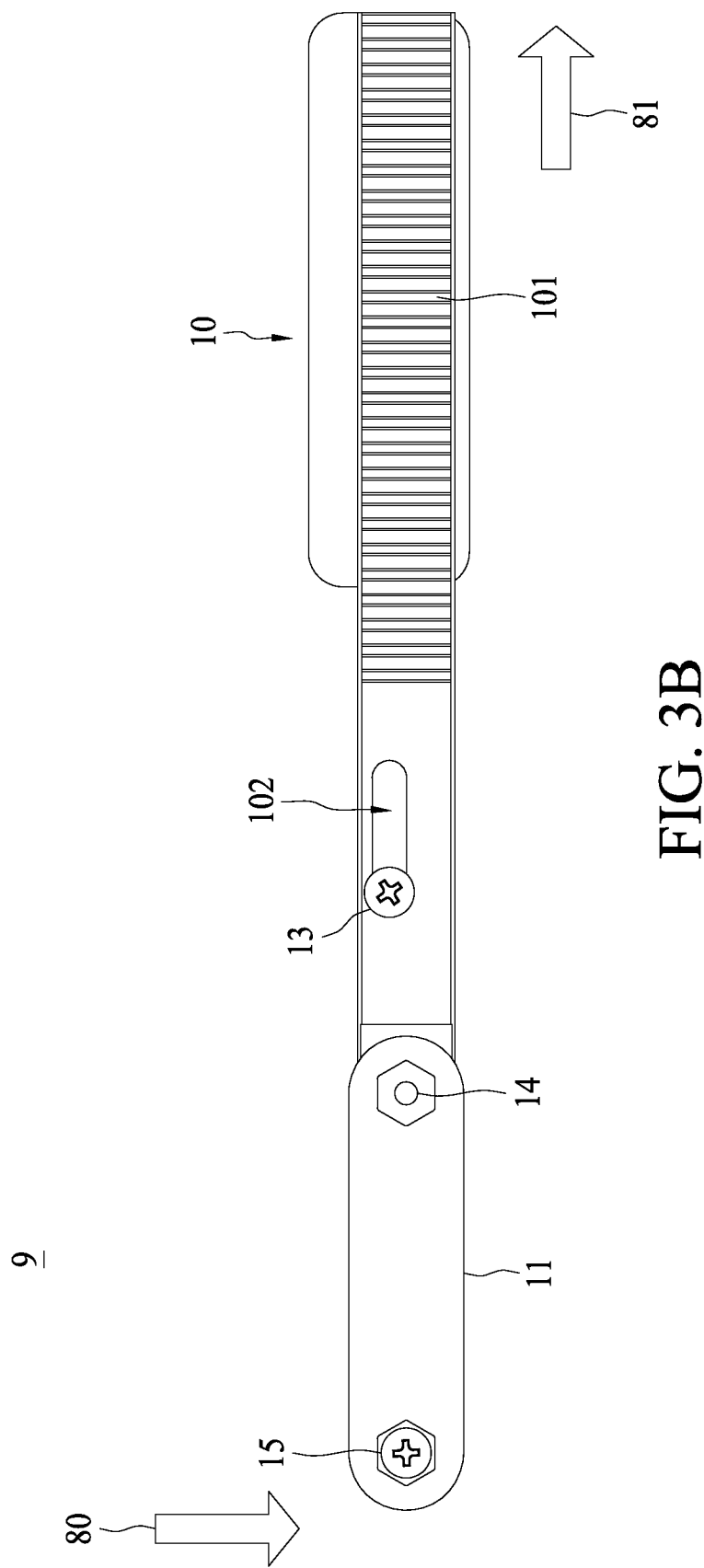
Figure 3C:
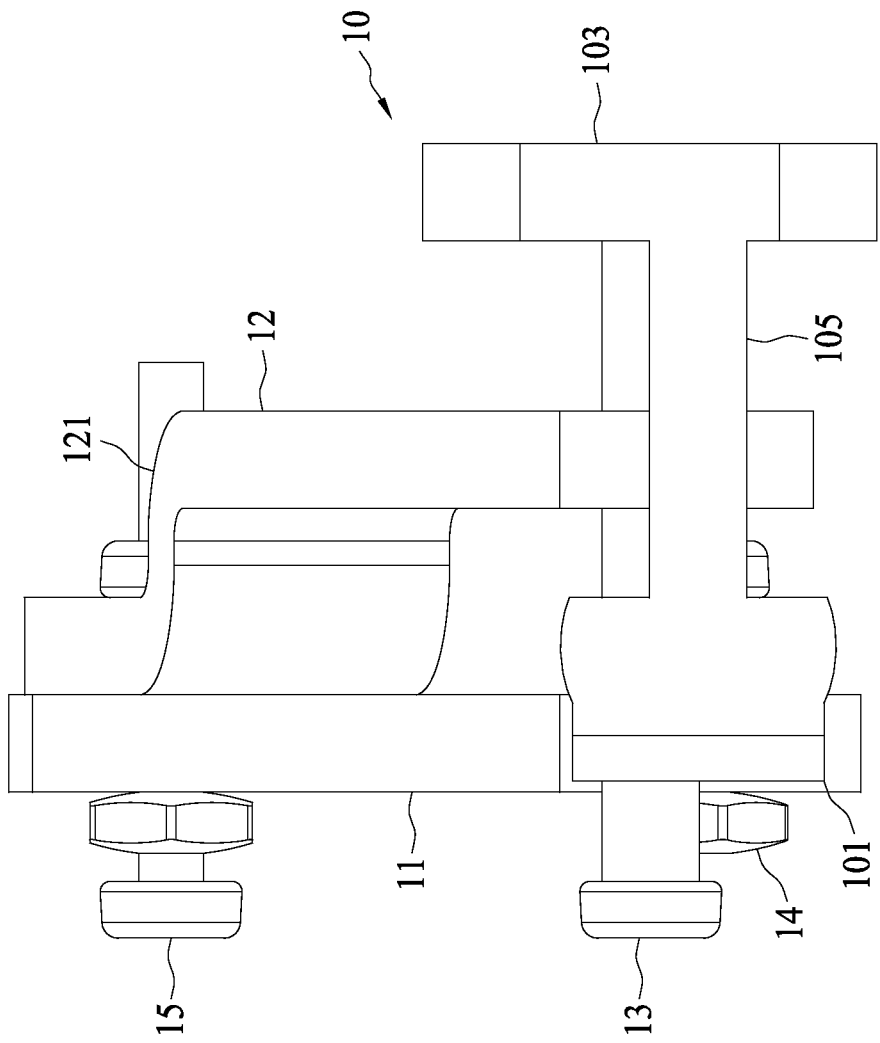

FIGS. 3A-3C are schematic diagrams of the transmission mechanism 9 in accordance with some embodiments of the present disclosure. Referring to FIG. 3A, the first pivot arm 10 includes a slot 102. The slot 102 is located between the rack 101 and the end portion of the shank 106. The slot 102 has a long oval shape and allows the third pivot 13 to penetrate through. Further, the slot 102 is sized to confine the first pivot arm 10 to move with respect to the third pivot 13 in a predetermined direction. The third pivot 13 penetrates through the slot 102 and the third pivot arm 12. An end of the third pivot 13 is fixed at a sidewall of the bottom case 60. By means of the slot 102, the first pivot arm 10 is confined to move along the second direction within the slot 102.

In the absence of an external force, the first pivot arm 10, the second pivot arm 11, and the third pivot arm 12 form a triangular shape as shown in FIG. 3A.

The third pivot 13 is now at a first position in the slot 102.

FIG. 3B depicts a motion of the transmission mechanism 9 after receiving a force in the first direction 80. In response to the force, the transmission mechanism 9 extends from the triangular shape shown in FIG. 3A into a straight line shown in FIG. 3B. When the second pivot 15 is pressed by the force, the third pivot 13 serves as a fulcrum. The third pivot arm 12 obtains a torque and causes the second pivot arm 11 to rotate with respect to the first pivot 14. The first pivot 14 serves as a fulcrum for the second pivot arm 11. The second pivot arm 11 then pushes the first pivot arm 10. At this moment, the first pivot arm 10, the second pivot arm 11, and the third pivot arm 12 extend in a straight line in the second direction 81. The first pivot arm 10 now comes to a second position in the slot 102. Therefore, the transmission mechanism 9 is able to transmit the force in the second direction 81. The second pivot arm 11 is configured to, in response to the force applied in the first direction 80, cause the first pivot arm 10 to extend in the second direction 81 with respect to the third pivot arm 12 within a predetermined range defined by the slot 102.

During operations, the third pivot 13 remains immobilized because the third pivot 13 is fixed at an inner sidewall of the bottom case 60. On the contrary, during operations, the first pivot 14 and the second pivot 15 is moveable with respect to the third pivot 13. For example, the second pivot 15 moves towards the bottom case 60 after receiving the force in the first direction 80, and the first pivot 14 moves in the second direction 81.

FIG. 3C depicts another view of the transmission mechanism 9. The main plate 105 is integral with the rack 101 and the side 103 on opposite sides of the main plate 105. A combination of the main plate 105, the rack 101 and the side 103 substantially forms an H-shaped structure. The H-shaped structure is configured to match the rails 40. Moreover, as previously discussed, the curved portion 121 provides a space between the first pivot 14 and the third pivot arm 12 so that the first pivot 14 does not interfere with the third pivot arm 12 during operation.

Figure 4:
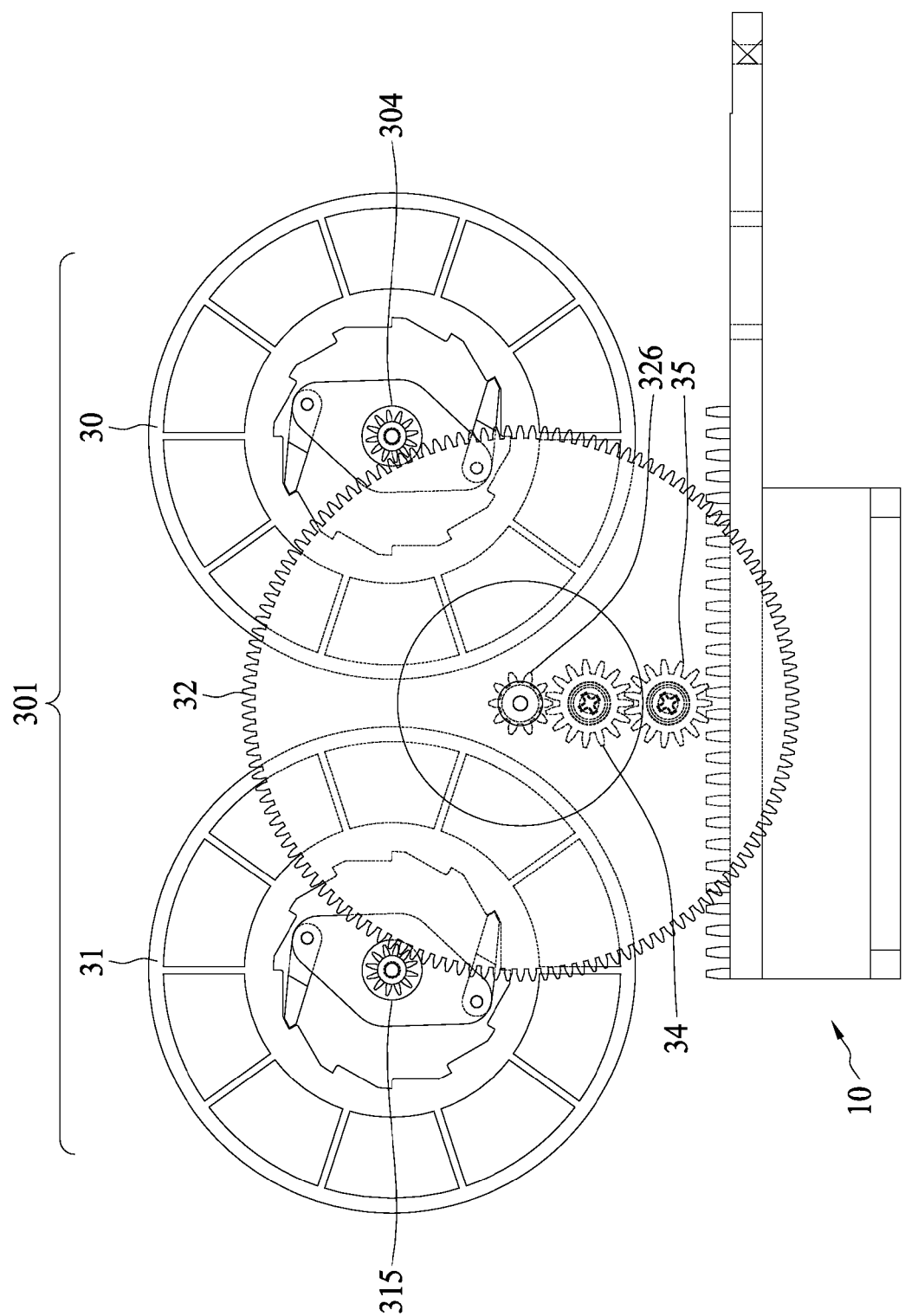
FIG. 4 is a schematic diagram of a gear configuration in accordance with some embodiments of the present disclosure.

FIG. 4 is a schematic diagram of a gear configuration in accordance with some embodiments of the present disclosure. The rack 101 of the first pivot arm 10 meshes with the gear 35. The gear 35 meshes with the gear 34. Further, the gear 34 meshes with a core 326 of the gear 32. The gear 32 simultaneously meshes with a core 304 of the gear 30 and a core 315 of the gear 31. Therefore, as the first pivot arm 10 extends in the second direction 81, the force transmitted in the second direction 81 drives the gear set 301. The gears 30 and 31 receive kinetic energy and generate electrical power.

Figure 5A:
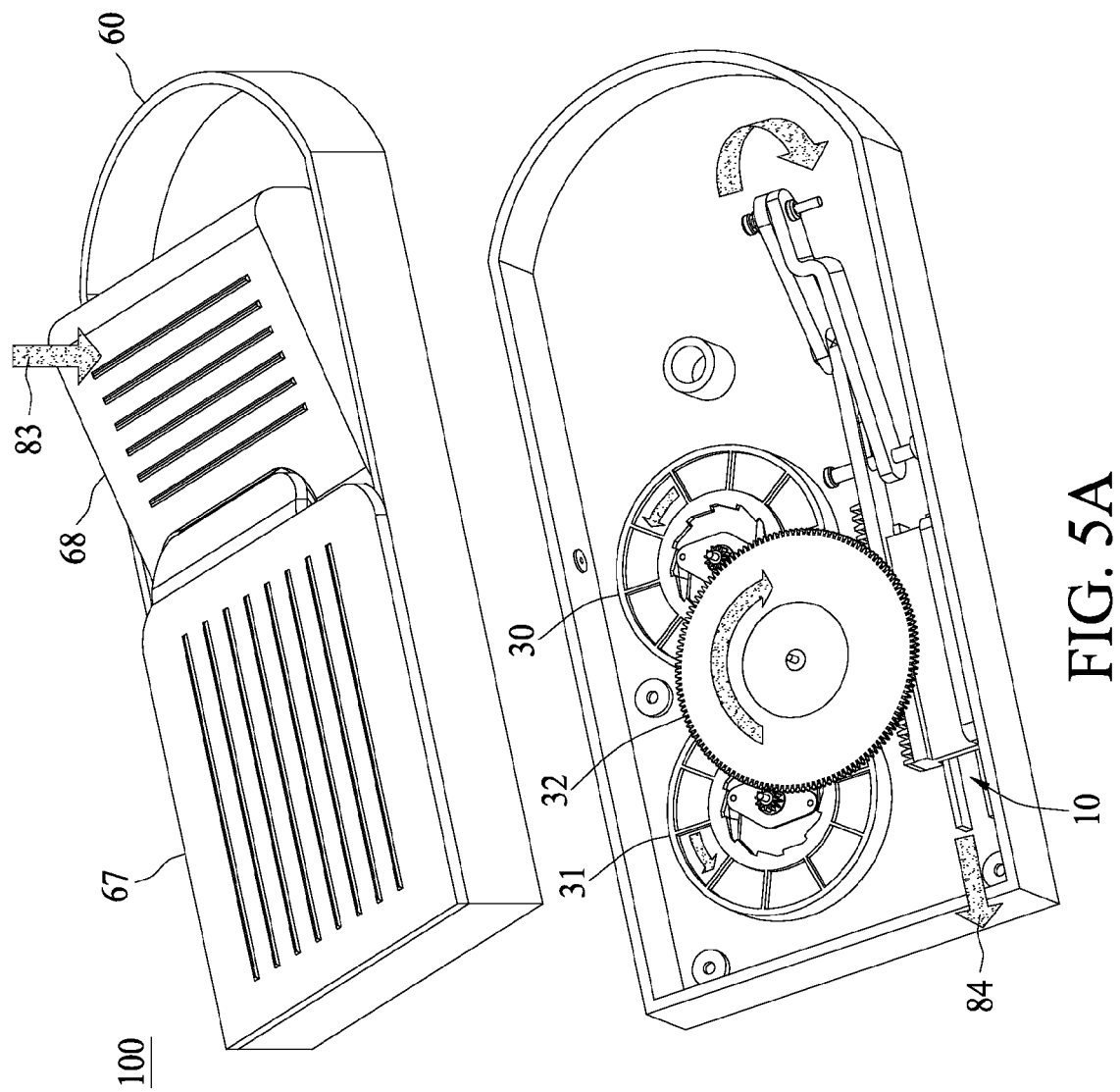
FIGS. 5A-5B are schematic diagrams illustrating an operation of the power generation device in accordance with some embodiments of the present disclosure.
Figure 5B:
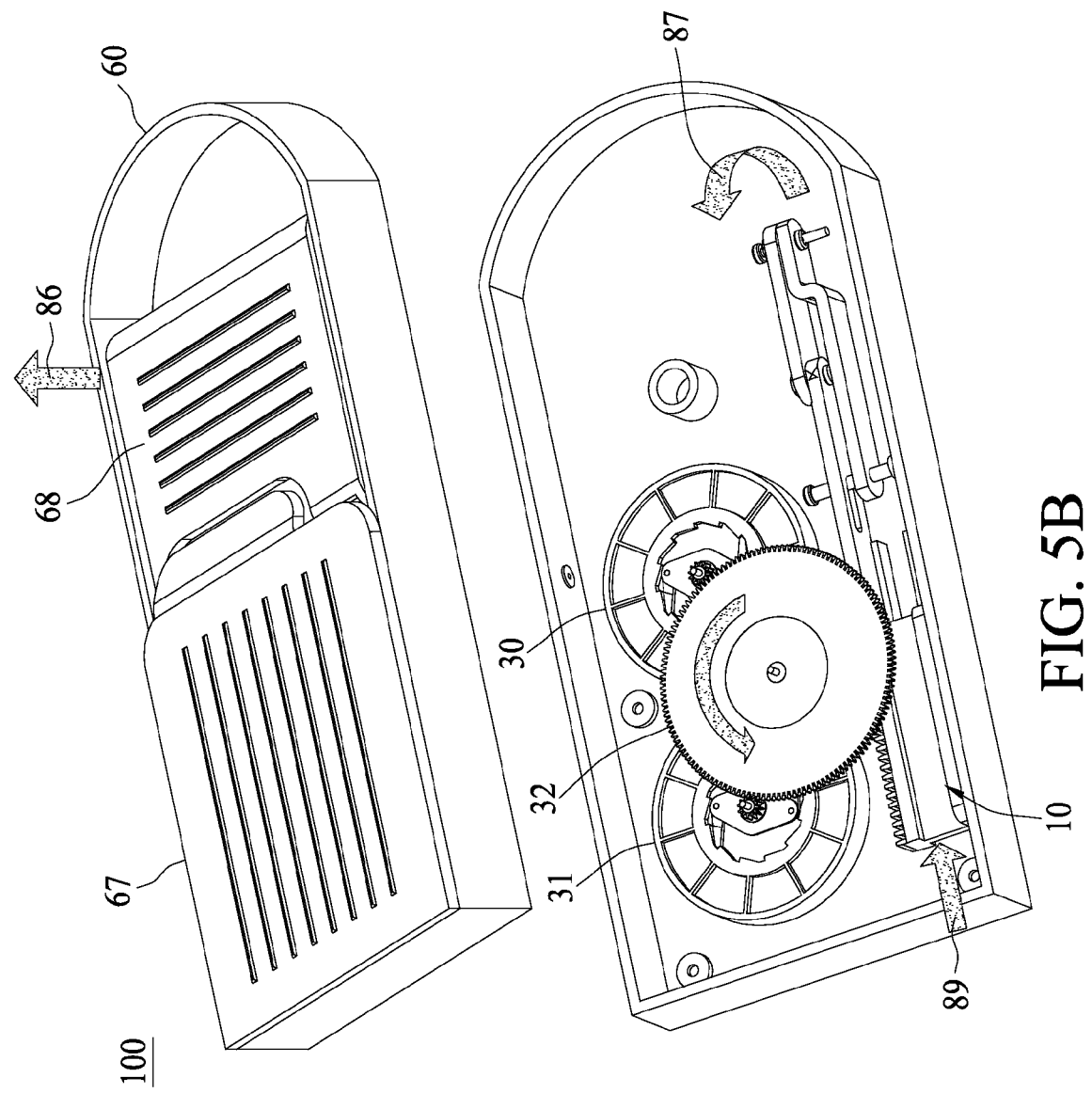

FIGS. 5A and 5B are schematic diagrams illustrating an operation of the power generation device 100 in accordance with some embodiments of the present disclosure. Referring to FIG. 5A, a first force 83 is applied on the second lid 68. The second lid 68 rotates from a first position to a second position. Because the second lid 68 is secured to the end of the second pivot 15, the first force 83 simultaneously presses the transmission mechanism 9. The transmission mechanism 9 extends from a triangular shape to a straight line. The first pivot arm 10 transmits a second force 84 in response to the first force 83. The first pivot arm 10 drives the gears 30, 31, and 32. In some embodiments, the gear 32 rotates clockwise while the gears 30 and 31 rotate counterclockwise. Moreover, the gears 30 and 31 may only generate electrical power when rotate counterclockwise. Specifically, in the counterclockwise direction, the cores of the gears 30 and 31 clip the gear set 301 and generate electrical power. In the clockwise direction, the cores of the gears 30 and 31 rotate but do not generate electrical power. In some embodiments, the gears 30 and 31 are configured to generate electrical power both in clockwise and counterclockwise directions.

Referring to FIG. 5B, when the first force 83 is removed, as indicated by an arrow 86, the second lid 68 rotates from the second position to the first position. By function of the spring 50 disposed under the second lid 68, the second lid 68 is restored and pushed upward to the first position. At this moment, the transmission mechanism 9 retracts from the straight line into the triangular shape. The second pivot 15 is lifted upward as shown by an arrow 87. Thus, the first pivot arm 10 is pulled back as shown by an arrow 89. At this moment, the gear 32 rotates counterclockwise. The gears 30 and 31 are unable to generate electrical power.

Figure 6:
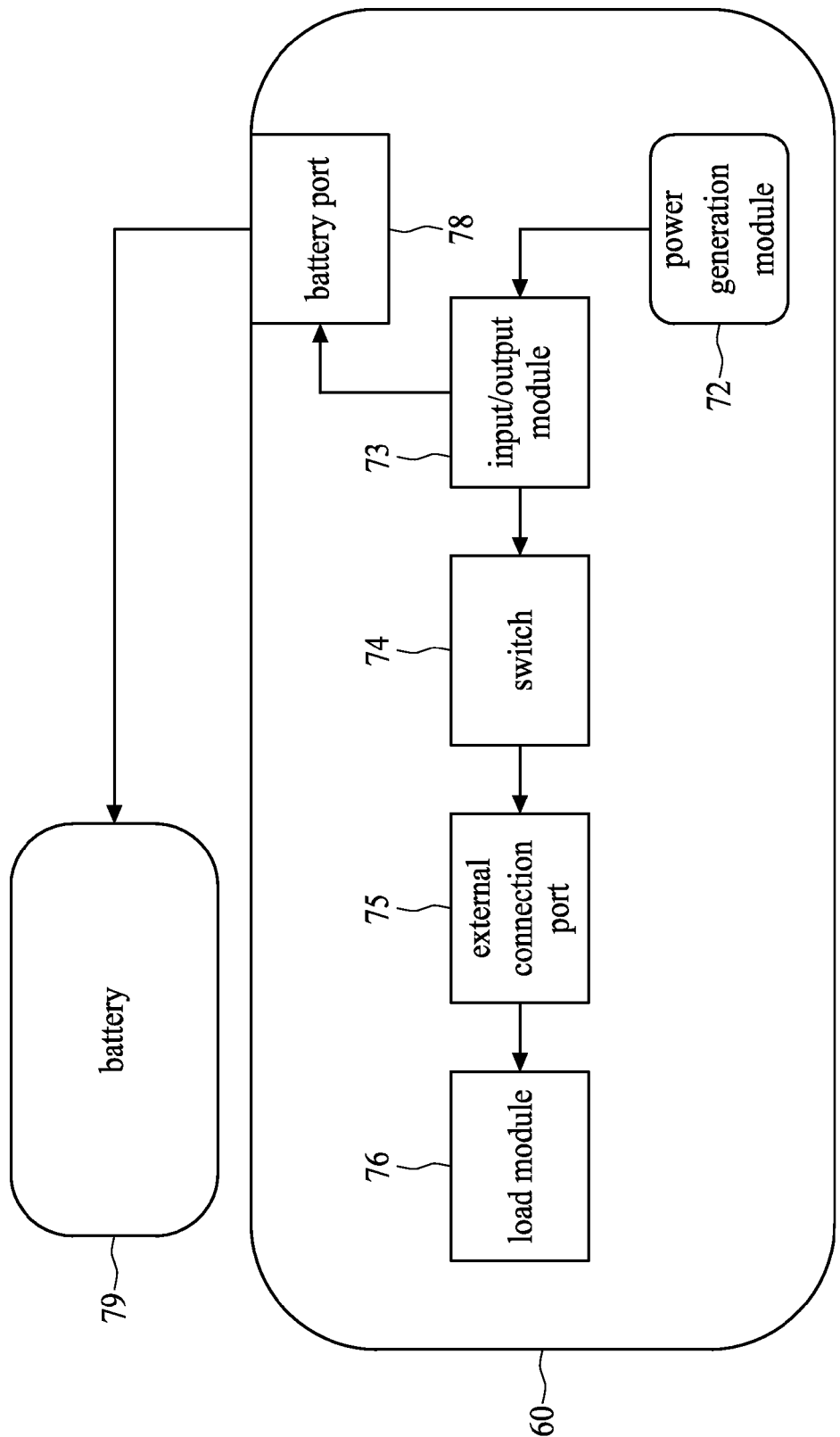
FIG. 6 is a block diagram of a power generation device in accordance with some embodiments of the present disclosure.

FIG. 6 is a block diagram of a power generation device 200 in accordance with some embodiments of the present disclosure. Referring to FIG. 6, the power generation device 200 includes a power generation module 72, an input/output module 73, a switch 74, an external connection port 75, a load module 76, a battery port 78 and a battery 79. The power generation module 72 is similar to or the same as the power generation device 100 described and illustrated with reference to FIG. 1. The power generation module 72 is configured to generate electrical power and provide the electrical power to the input/output module 73. The input/output module 73 distributes the electrical power to a next stage module or circuit, i.e., the switch 74 or battery port 78 coupled with the input/output module 73. Further, the switch 74 couples with the external connection port 75. The external connection port 75 serves as a port for connecting a load. The external connection port 75 further couples with the load module 76. The load module 76 may include a sole heating device, light emitting diode (LED), or warning lights. The battery port 78 couples with the battery 79, which stores or provides electrical power.

The power generation device 100 when embedded in footwear such as a shoe can generate electrical power continuously by the weight of a user while walking or jogging. Users need not apply extra force to generate electrical power, unlike power generation devices used by hand. The power generation device 100 thus provides a convenient and labor-saving operation for power generation. In addition, the power generation device 100 may also provide a larger generating capacity than piezoelectric power generation devices. Further, the power generation device 100 has a smaller volume and a more compact design that can be integrated with other power generating devices.

The above description includes exemplary operations, but these operations are not necessarily required to be performed in the order shown. Operations may be added, replaced, changed order, skipped, and/or eliminated as appropriate, in accordance with the spirit and scope of the disclosure. Accordingly, the scope of the disclosure should be determined with reference to the following claims, along with the full scope of equivalences to which such claims are entitled.

What is claimed is:

1. A power generation device comprising:
    a first pivot arm having a shank extendable in a predetermined direction, and a rack arranged along the predetermined direction, wherein the shank has a slot between the rack and an end portion of the shank;
    a second pivot arm having a first end portion coupled with the end portion of the shank at a first pivot; and
    a third pivot arm having a first end portion coupled with a second end portion of the second pivot arm at a second pivot, and a second end portion of the third pivot arm coupled with the slot of the shank at a third pivot,
    wherein, in response to a force in a first direction, the second pivot arm is configured to cause the first pivot arm to extend in the predetermined direction with respect to the third pivot within a predetermined range defined by the slot.

2. The power generation device of claim 1, wherein the first pivot arm comprises a main plate integral with the rack.

3. The power generation device of claim 1, wherein the first pivot arm is configured to slide on a pair of rails.

4. The power generation device of claim 1, wherein the rack meshes with a power generation gear.

5. The power generation device of claim 1, wherein the slot has a size which allows the first pivot arm to move with respect to the third pivot in the predetermined direction.

6. The power generation device of claim 1, wherein the third pivot arm comprises a curved portion to separate the third pivot arm from the shank of the first pivot arm.

7. The power generation device of claim 1, wherein the third pivot has an end fixed at a case.

8. A shoe equipment having a power generation device comprising:
  a bottom case having a pair of rails;
  a power generation device comprising:
    a first pivot arm having a shank extendable in a predetermined direction, and a rack arranged along the predetermined direction, wherein the shank has a slot between the rack and an end portion of the shank;
    a second pivot arm having a first end portion coupled with the end portion of the shank at a first pivot;
    a third pivot arm having a first end portion coupled with a second end portion of the second pivot arm at a second pivot, and a second end portion of the third pivot arm coupled with the slot of the shank at a third pivot,
    wherein, in response to a force in a first direction, the second pivot arm is configured to cause the first pivot arm to extend in the predetermined direction with respect to the third pivot within a predetermined range defined by the slot;
    a spring; and
    a lid secured to the second pivot and covering the bottom case, wherein the spring is configured to restore the lid to a first position.

9. The shoe equipment of claim 8, wherein the first pivot arm comprises a main plate integral with the rack.

10. The shoe equipment of claim 8, wherein the first pivot arm is configured to slide on the rails.

11. The shoe equipment of claim 8, wherein the rack meshes with a power generation gear.

12. The shoe equipment of claim 8, wherein the slot has a size which allows the first pivot arm to move with respect to the third pivot to move in the predetermined direction.

13. The shoe equipment of claim 8, wherein the third pivot arm comprises a curved portion to separate the third pivot arm from the shank of the first pivot arm.

14. The shoe equipment of claim 8, wherein the third pivot has an end fixed at the bottom case.

15. The shoe equipment of claim 8, wherein the bottom case has a shape of a heel that is embedded in shoes.

* * * * *